US005300774A

United States Patent [19]

Buttrill, Jr.

[11] Patent Number: 5,300,774

[45] Date of Patent: Apr. 5, 1994

[54] TIME-OF-FLIGHT MASS SPECTROMETER WITH AN APERTURE ENABLING TRADEOFF OF TRANSMISSION EFFICIENCY AND RESOLUTION

[75] Inventor: S. E. Buttrill, Jr., Palo Alto, Calif.

[73] Assignee: Applied Biosystems, Inc., Foster City, Calif.

[21] Appl. No.: 691,272

[22] Filed: Apr. 25, 1991

[51] Int. Cl.[5] ........................ B01D 59/44; H01J 49/00

[52] U.S. Cl. ........................ 250/287; 250/288

[58] Field of Search ............ 250/281, 287, 288, 423 P, 250/309

[56] References Cited

U.S. PATENT DOCUMENTS 3,727,047 4/1973 Janes .................. 250/287
3,936,693 2/1976 Parks et al. .................. 313/427
4,107,527 8/1978 Cherepin et al. .................. 250/309
4,625,112 11/1986 Yoshida .................. 250/287
4,740,692 4/1988 Yamamoto et al. .................. 250/288

*Primary Examiner*—Bruce C. Anderson
*Attorney, Agent, or Firm*—John A. Frazzini

[57] ABSTRACT

A time-of-flight mass spectrometer in which sample ions are generated from a target and are focussed into an ion beam that is incident onto a detector. A barrier that defines an aperture in the path of the ion beam is positioned to block ions having an extra large deviation from an average time-of-flight of the ions, thereby improving resolution. The aperture can be adjusted to adjust a tradeoff between sensitivity and resolution. Alternatively, the position of the aperture or the bias on an einzel lens can be adjusted to control this resolution.

12 Claims, 13 Drawing Sheets

4B
414
40
415
42
43
-20,000 V
41
41
413
-4,000 V
412
16
411
A'
+200 V
47
46
410
49
45
44
48
4B 41
40
413
412
16
411
A'
410
49
48

TIME-OF-FLIGHT MASS SPECTROMETER WITH AN APERTURE ENABLING TRADEOFF OF TRANSMISSION EFFICIENCY AND RESOLUTION

BACKGROUND OF THE INVENTION

This invention relates in general to Time-of-Flight Mass Spectrometers and relates more particularly to special structures for increasing the resolution of such mass spectrometers.

In the figures, the first digit of a reference numeral indicates the first figure in which is presented the element indicated by that reference numeral.

In a typical time-of-flight spectrometer, a sample is ionized by a short pulse of localized energy to produce an initial region of ions that is localized both spatially and temporally. These ions are accelerated by an electric potential and are usually allowed to drift through at least one field-free region before they reach a detector that detects the reception of these ions. Within these field-free regions, the ion trajectories within this beam are substantially parallel so that the beam does not become unduly large when it reaches the next element within the spectrometer.

The electric field accelerates each ion to a velocity proportional to the square root of the ratio of the ion charge to the ion mass so that the time of arrival at the detector is inversely proportional to the square root of the mass of each ion. Therefore, a timer is started at the time of the energy pulse and the measured interval until a given group of ions reaches the detector is utilized to identify the charge to mass ratio of these ions. A mass spectrum of the sample is generated from the intensity of detected ions as a function of time. A time-of-flight spectrometer provides the significant advantages that a complete mass spectrum is produced by each pulse, that many mass spectra can be produced per second and that there is no limit on the mass range.

The initial velocity of an ion affects its time-of-flight. In the discussions which follow, the ion optical elements have cylindrical symmetry about the direction of the ion acceleration and drift. This direction will be referred to herein as the "longitudinal direction". The direction perpendicular to the direction of ion acceleration will be referred to as the "lateral direction". Likewise, the components of an ion's initial velocity will be referred to herein as the "longitudinal component of the initial velocity" and the "lateral component of the initial velocity".

It is well known (see, for example, the article R. Frey, et al *A High-Resolution Time-of-Flight Mass Spectrometer Using Laser Resonance Ionization*, Z. Naturforsch., Teil A, (1985) Vol. 40, pp, 1349–1350) that the resolution of mass peaks is increased by reducing as much as possible the initial spatial and temporal dimensions of the spacetime region in which ions are generated and by countering peak broadening due to kinetic energy differences of the ions at the time of generation. If ions are generated over a significant time interval, then the measured time of flight will not be equal to the actual time of flight for each ion. It is therefore important to minimize the temporal spread of ion generation. If the spatial spread of ion generation is significant, then these ions will have unequal spatial paths. More significantly, since the ions are generated in an accelerating electric field, if they are generated over a significant spatial interval along the direction of this electric field, then the ions will receive a significant spread of energies. Because identical ions accelerated to different energies will have different time-of-flight values, such energy spreads will degrade the resolution of the time-of-flight spectrum.

An ion reflector is utilized to compensate for the part of the time-of-flight differences that arises from initial differences in the longitudinal component of the drift velocity. For ions of equal charge-to-mass ratio, those ions with a larger initial positive longitudinal component would arrive at the detector earlier than ions with zero longitudinal component. At the ion reflector, the higher energy ions penetrate farther into the reflector, thereby spending a greater time in the reflector than those with zero initial longitudinal component. The reflector parameters are selected so that the differential times spent in the ion reflector compensate for the time-of-flight differences resulting from the longitudinal velocity component differences of the ions.

In the article by Frey, et al, a gridless ion reflector is presented to avoid the perturbations introduced by an ion reflector utilizing conductive grids. A laser pulse is used to ionize a gaseous sample because a laser has the extremely small spatial and temporal width needed to produce high resolution. Also, the laser can be tuned to enable selective ionization of one sample component and the wavelength of the laser can be selected to produce ions either with or without fragmentation of the initial particles.

In addition to the use of a reflector to compensate for initial potential energy differences of ions, other techniques are available to prevent initial kinetic and potential energy differences from degrading resolution. As taught in the article M. Yang, et al, *A Reflectron Mass Spectrometer With UV Laser-Induced Surface Ionization*, International Journal of Mass Spectrometry and Ion Processes, 75 (1987) 209–219, the initial potential energy spread is substantially eliminated by adsorbing sample molecules onto the surface of a prism and then directing the laser beam through the prism onto these adsorbed sample molecules. This surface is perpendicular to the electric acceleration field so that all of these particles have the same initial potential energy. To avoid ionizing gas molecules above the surface, the laser beam is directed to internally reflect off of the metallized surface on which the particles are adsorbed.

Other factors identified in this article as affecting resolution include: the flatness of electric grids; and the stability and accuracy of the delay time generator. This latter problem is addressed in the following patent issued to Yvon Le Beyec, et al.

U.S. Pat. No. 4,694,168 entitled *Time-of-Flight Mass Spectrometry* issued to Yvon Le Beyec et al on Sep. 15, 1987 is directed to the accurate detection of neutral and ionized fragments from particles that decay during flight in the spectrometer. Sample ions are produced by bombardment with a high energy primary ion from a 2-particle decay process. A time-of-flight timer is started in response to detection of the 2nd of these 2 decay particles, thereby providing accurate activation of this counter.

The article X. Tang, et al, *A Secondary Ion Time-of-Flight Mass Spectrometer With An Ion Mirror*, International Journal of Mass Spectrometry, (1988) pp. 42–66 provides a detailed analysis of operation and errors of this system. Daughter ions have substantially the same velocity as the parent, and therefore are equivalent to parent ions in the ion spectrum. However, the lower energy of daughters means that they spend a shorter time in the mirror, thereby separating them from the parent particles in the spectrum. This separation improves sensitivity compared to systems without an ion mirror. To enable determination of decay rates, a movable target enables the distance from the ion source to the reflector to be varied. An adjustable iris preserves the angular acceptance angle as this distance is varied. A long flight path is utilized for improved resolution and a short path is utilized for higher efficiency, which is useful in the low intensity correlation measurements.

Because of the above-listed advantages of secondary ion time-of-flight mass spectrometers, it is desirable to extend the application of such mass spectrometers to the high mass ions encountered in medical and biological applications. Fortunately, the article R. J. Beuhler and L. Friedman, *Threshold Studies Of Secondary Electron Emission Induced By Macro-Ion Impact On Solid Surfaces*, Nuclear Instruments and Methods, 170 (1980), p. 309–315 teaches that the actual rate of secondary electron emission is much greater for high mass secondary ions than is predicted by the classical analysis which treats the incident primary ion as a single particle having an ability to scatter high mass secondary ions according to the classical principles of conservation of energy and momentum. Instead, to explain the much higher than expected rate of generation of secondary electrons by very high mass ions, this article concludes that the incident ion must be treated as a collection of its component layers of atoms, each of which can separately contribute energy to the secondary electron formation process. Because of this, time-of-flight mass spectrometry for typical biological molecules is feasible in spite of their very high mass.

In the article Georges Slodzian, *Microanalyzers Using Secondary Ion Emission* in the text Applied Charged Particle Optics, edited by A. Septier, Academic Press, 1980, the ion optics section utilizes an immersion lens followed by an einzel lens.

In the article J. Orloff and L. W. Swanson, *An Asymmetric Electrostatic Lens For Field-emission Microprobe Applications*, J. Appl. Phys. 50(4), April 1979, p. 2494, an asymmetric lens is analyzed for use as the accelerating element in high current (tens of nanoamperes) electron beams for submicron beams. This type of lens has the advantage of providing continuous voltage variability of focus while maintaining a fixed image and object distance.

SUMMARY OF THE INVENTION

In accordance with the illustrated preferred embodiment, a mass spectrometer is presented that enables an improved level of resolution to be achieved and that allows a tradeoff between resolution and sensitivity. This particular embodiment is designed to detect ions of mass up to several times $10^5$ AMU so that it can be utilized for biological and medical applications such as analysis of biopolymers. However, the adjustability of resolution is applicable for other classes of devices.

This embodiment contains three main components: an ion source, a reflector and a post acceleration detector. Ions are ejected from a sample by a pulse of energy that is highly localized temporally and spatially. An ion source optics section accelerates the emitted ions and focusses them into a beam that is directed onto a reflector. The reflector compensates at least partially for initial kinetic energy differences in these ions inherent in the process of producing the ions with this pulse of localized energy. This beam travels from the reflector to a post acceleration detector. The additional energy imparted to these ions within the post-acceleration detector increases the energy of the ions sufficiently to produce an acceptable level of detector sensitivity even for ions of mass on the order of $10^5$ AMU.

From time-of-flight simulations for ions ejected from various parts of the ion source along various directions, it was observed that it is possible to position an aperture between the ion source optics section and the detector at a position such that the aperture eliminates ions having a large deviation from the average time-of-flight of the ion beam. Elimination of these ions improves the resolution at the cost of decreased spectrometer sensitivity. Because some applications require high sensitivity and other applications require high resolution, it is advantageous to be able to control the fraction of ions that pass through this aperture. In a first class of embodiments, the ion source optics section is adjusted to control the width of the ion beam at the aperture. In a second class of embodiments, the size of the aperture is controlled to control the fraction of ions that pass through the aperture. Although the beam and the apertures need not be cylindrically symmetric, it is preferred that both the beam and apertures be substantially cylindrically symmetric. In most embodiments, the beam will pass through at least one field-free region. In such field-free regions, the ion trajectories in the beam are typically substantially parallel so that the beam diameter does not increase inordinately in any of these regions. It is advantageous to locate the aperture that controls the sensitivity/resolution tradeoff in such a region because the aperture will thereby not adversely affect any fields that accelerate and/or focus the ion beam. It is also advantageous for the aperture to be located near one of the optical elements so that it can be accurately aligned relative to this element so that it is substantially centered on the ion beam.

The preferred embodiments discussed below are presented to illustrate the present invention, but are not intended to limit it.

DESCRIPTION OF THE PREFERRED EMBODIMENT

Figure 1:
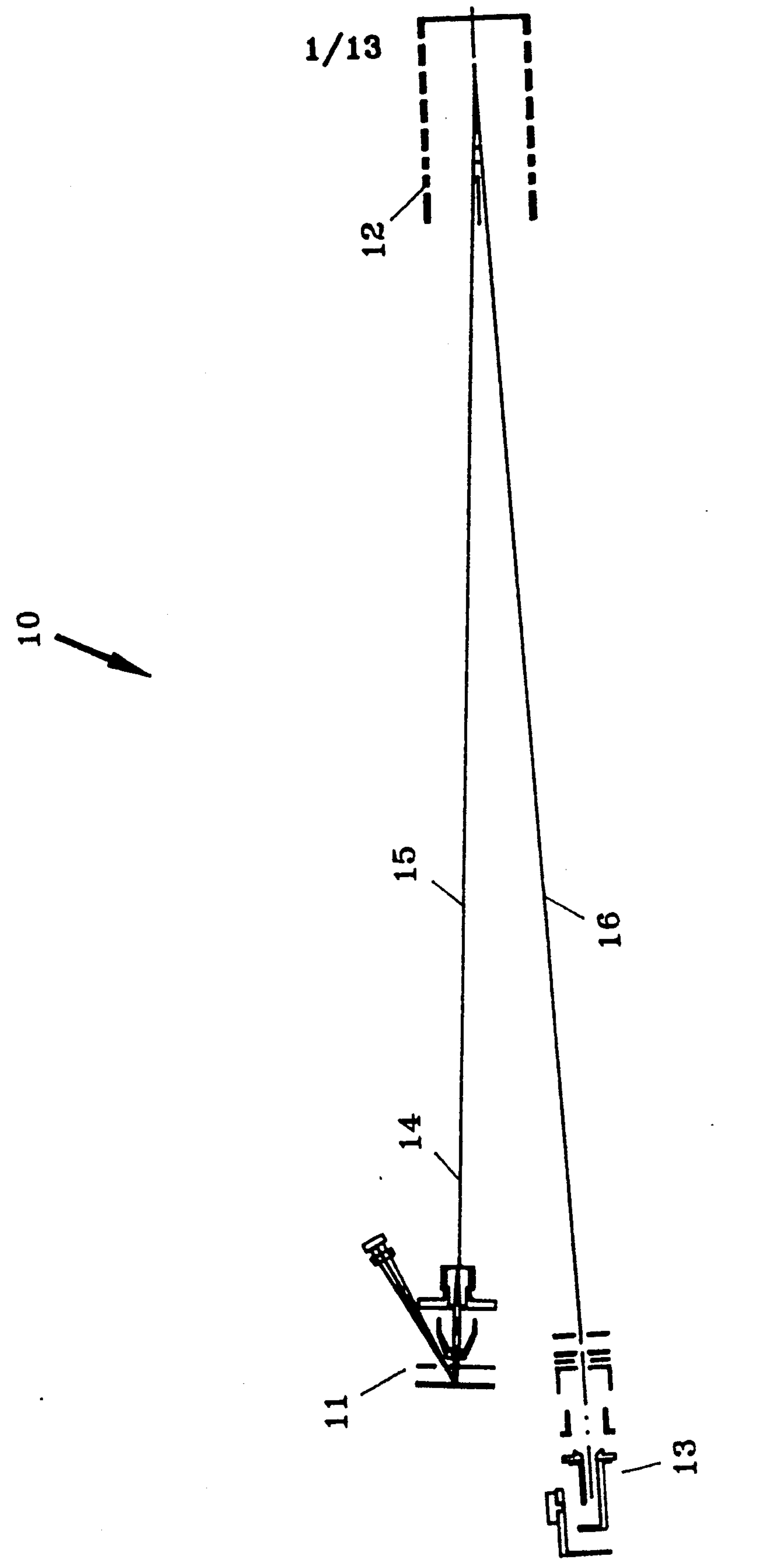
FIG. 1 is a cross-section of the complete optical layout of the mass spectrometer.

FIG. 1 illustrates a time-of-flight mass spectrometer 10 in which the resolution of the spectrometer can be adjusted. Mass spectrometer 10 contains 3 major components: (i) an ion source optics section 11 illustrated in greater detail in FIG. 2; (ii) an ion reflector 12 illustrated in greater detail in FIG. 3; and (iii) a post-acceleration ion detector 13 illustrated in greater detail in FIG. 4. The regions between these 3 major components are substantially field-free and the ion trajectories within such field-free regions are substantially parallel.

Figure 2:
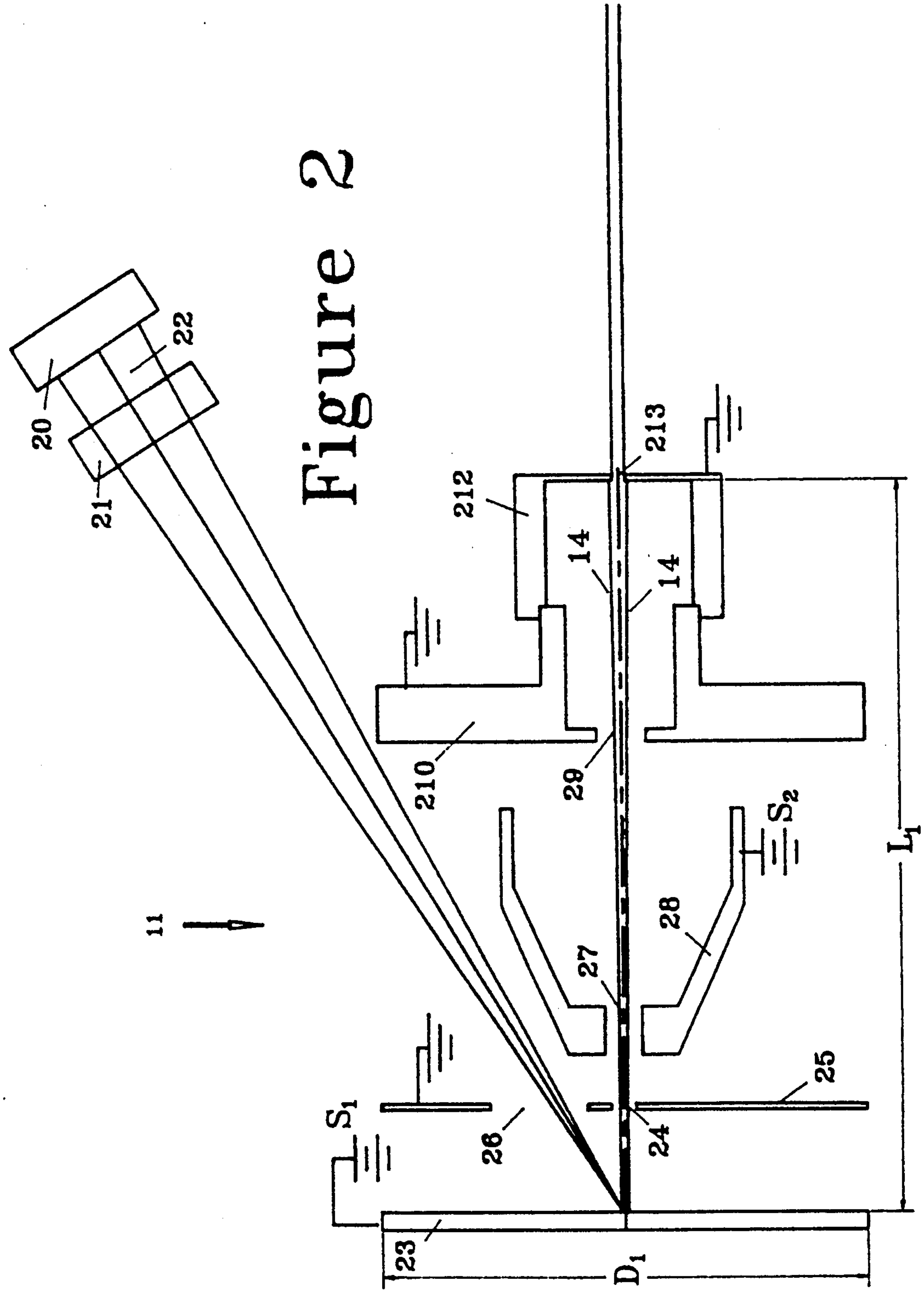
FIG. 2 is a cross-section of the ion source optics section of the mass spectrometer of FIG. 1.

As is illustrated in FIG. 2, source optics section 11 has a diameter $D_1$ and a length $L_1$ of 101.5 and 128.0 millimeters, respectively. In this source optics section, an optical lens 21 focusses a narrow pulse of laser light 22 from a laser 20 onto a small region of a target 23 coated with a material under test. For measurement of biopolymers, these biopolymers are coated onto target 23 within an organic matrix that exhibits strong optical absorption at the wavelength of the laser light. In other embodiments, the target can include a substrate that is strongly absorbing to the laser light. At target 23, this pulse has a small temporal extent on the order of 0.5 to 5 nanoseconds so that ions are generated at the target only during a very small temporal interval. A timer (not shown) is activated at the time of the laser pulse and it measures the times for various types of the generated ions to reach the detector.

The ions emitted from target 23 exhibit an intensity distribution as a function of the angle $\phi$ of the direction of emission relative to a normal to the front surface of the target. Only those ions that pass through a first aperture 24 in a conductive, opaque barrier 25 are included in an ion beam 14 that passes through the ion optics. Opaque barrier 25 also includes a second aperture 26 through which laser pulse 22 is focussed onto the target. Barrier 25 is grounded and target 23 is maintained at 3,000 volts by a voltage source $S_1$ so that target 23 and aperture 24 in barrier 25 function as an immersion lens to collect ions emitted from the target by the laser beam.

The ions passing through aperture 24 also pass through an aperture 27 in a conductive barrier 28 and an aperture 29 in a conductive barrier 210. Barriers 25 and 210 are grounded and barrier 28 is maintained at a controlled voltage in the range $-1{,}000$ volts to $-7{,}500$ volts by a voltage source $S_2$. Barriers 25, 28 and 210 function as an einzel lens that, in conjunction with the immersion lens formed by elements 23 and 25, cooperate to focus the ions emitted from target 23 into an ion beam 14.

As is illustrated in FIG. 1, ion beam 14 is incident on an ion reflector 12 that reflects this beam onto a detector 13. The angle between an incident portion 15 of beam 14 and reflected portion 16 of this beam is 4 degrees. The parameters of reflector 12 are chosen to compensate substantially for time-of-flight differences of identical ions resulting from kinetic energy differences of emission from the target.

Figure 3:
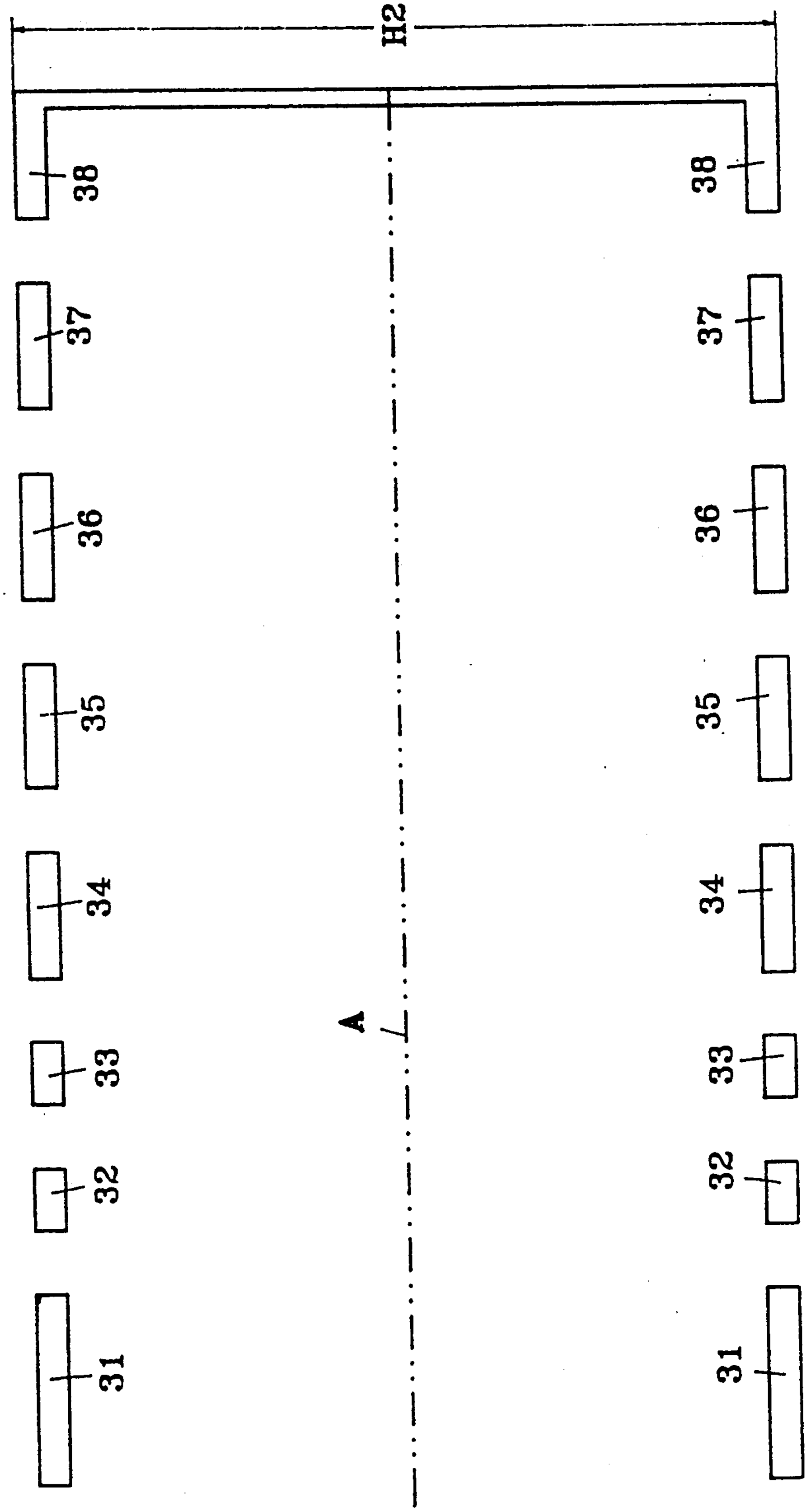
FIG. 3 is a cross-section of the ion reflector of the mass spectrometer of FIG. 1.

The structure of reflector 12 is shown in greater detail in FIG. 3. This reflector has a length $L_2$ and a height $H_2$ of 220 millimeters and 114 millimeters, respectively. This reflector is cylindrically symmetric about an axis A and consists of a set of electrodes 31-38 maintained at voltages of 0, 500, 1,800, 2,140, 2,480, 2,820, 3,160 and 3,500 volts, respectively. These parameters are selected to maximally compensate for time-of-flight differences of identical ions emitted from target 23 at different initial kinetic energies.

Figure 4A:
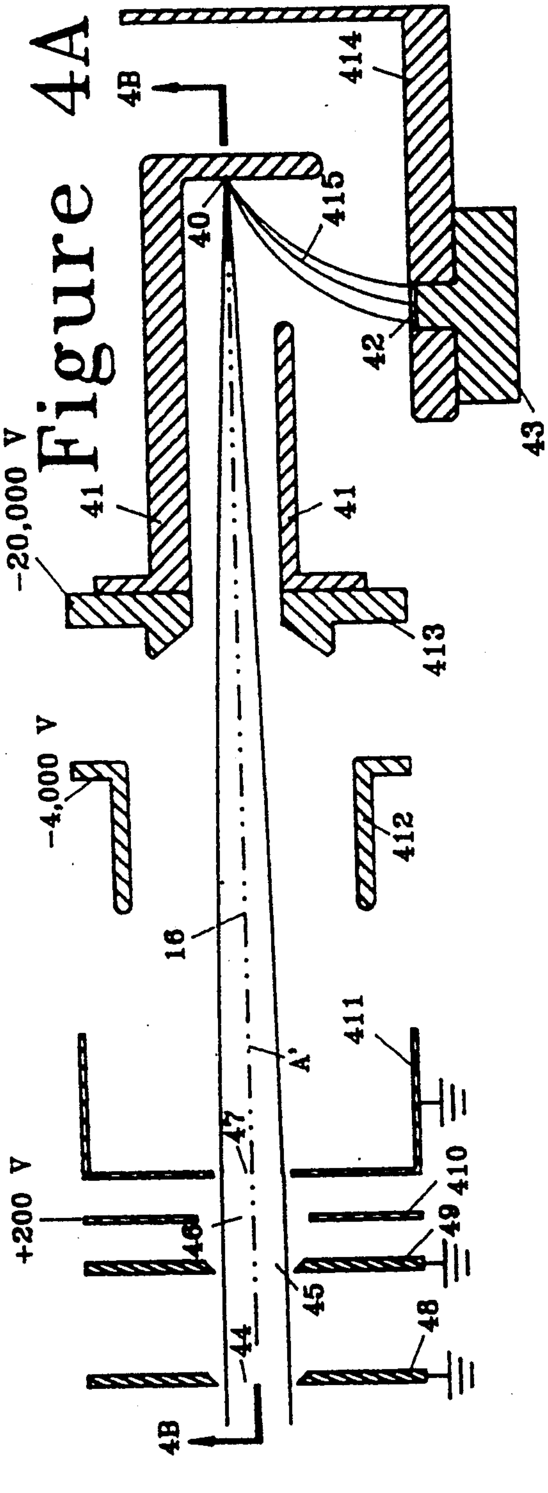
FIGS. 4A and 4B are top and side cross-sectional views of the post-acceleration ion detector of the mass spectrometer of FIG. 1.
Figure 4B:
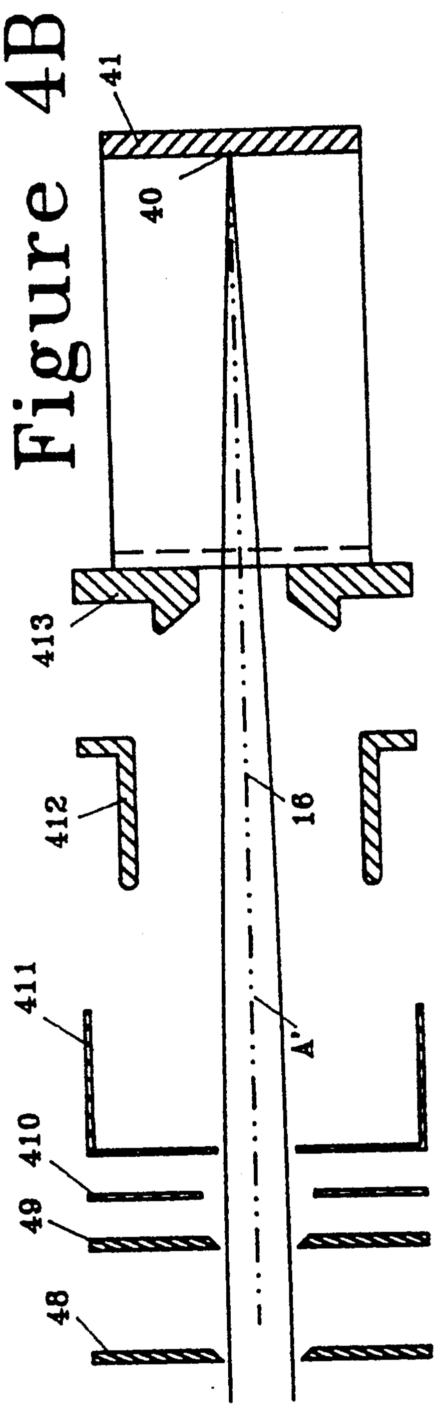

The details of detector 13 are shown in the top cross-sectional view in FIG. 4A and in the side cross-sectional view in FIG. 4B. The reflected portion 16 of ion beam 14 enters the detector substantially parallel to an axis A'. The ion beam is focussed to a small spot at 40 on a rear wall of a conductor 41 that emits secondary electrons 415 in response to impact of each ion in the ion beam 16. The electric fields created by conductor 41 and a conductor 414 direct these electrons 415 onto a fast scintillator 42 to produce photons that are detected by a photomultiplier 43.

Because this particular embodiment is designed to measure mass spectra up to several hundred thousand atomic mass units (AMU) and because such high mass ions generate secondary electrons with much greater efficiency at higher energies, the ions in beam 16 are subjected within this detector to an acceleration electric field that increases their energy sufficiently to produce an adequate number of secondary electrons per incident ion. The electric field within this detector is also shaped to focus the beam onto the back wall of element 41 at location 40. In addition, provision is made for excluding ions which are not part of reflected beam 16 because they also would be accelerated and produce unwanted noise signals.

Ions enter the detector through aperture 44 in barrier 48 which serves to define the maximum beam width. Barriers 49, 410 and 411 together act as a weak einzel lens, but their purpose is to prevent entry of ions with energies of less than approximately 100 eV formed by various processes within the mass spectrometer and which would otherwise produce unwanted noise signals. Barrier 411, ring 412 and conductor 413 function together as an accelerating lens which focusses the ion beam to a small spot at location 40.

Barriers 48, 49 and 411 are operated at ground potential. Barrier 410 and ring 412 are biased at +200 and $-4{,}000$ volts, respectively. Conductor 413 and conductor 41 are biased at $-20{,}000$ volts. Conductor 414 and scintillator 42 are at ground potential (0 volts). Parts 48, 49, 410, 411, 412 and 413 as well as apertures 44, 45, 46 and 47 are cylindrically symmetric about axis A'.

To optimize performance, software was utilized to calculate the trajectories of 0.1 eV ions emitted in 8 different directions for a point on axis and in 15 different directions from each of three off-axis points at different radial distances from the center of target 23. Each of these emission points and trajectories is contained in a plane that passes through the axis of symmetry of source optics section 11. For the on-axis emission point, the emission directions are spaced at 10 degree increments from 0 to 70 degrees and for the off-axis emission points, emission points, the emission directions are spaced at 10 degree increments from $-70$ to 70 degrees.

Figure 5A:
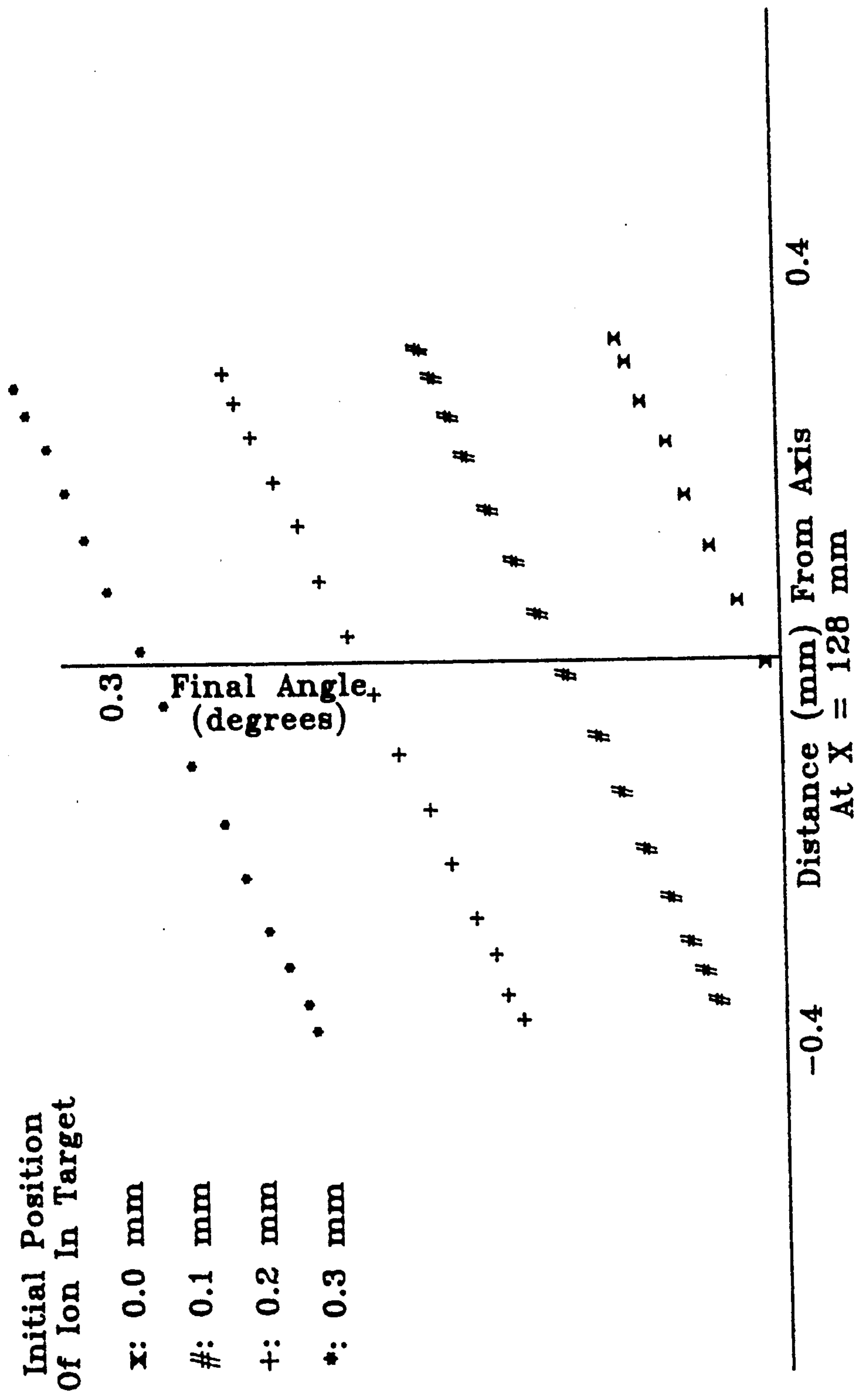
FIGS. 5A–5E illustrate the direction and off-axis distance of 53 different ion trajectories for einzel lens voltages of −7,500 volts, −6,400 volts, −5,000 volts 4,000 volts and −1,000 volts, respectively.
Figure 5B:
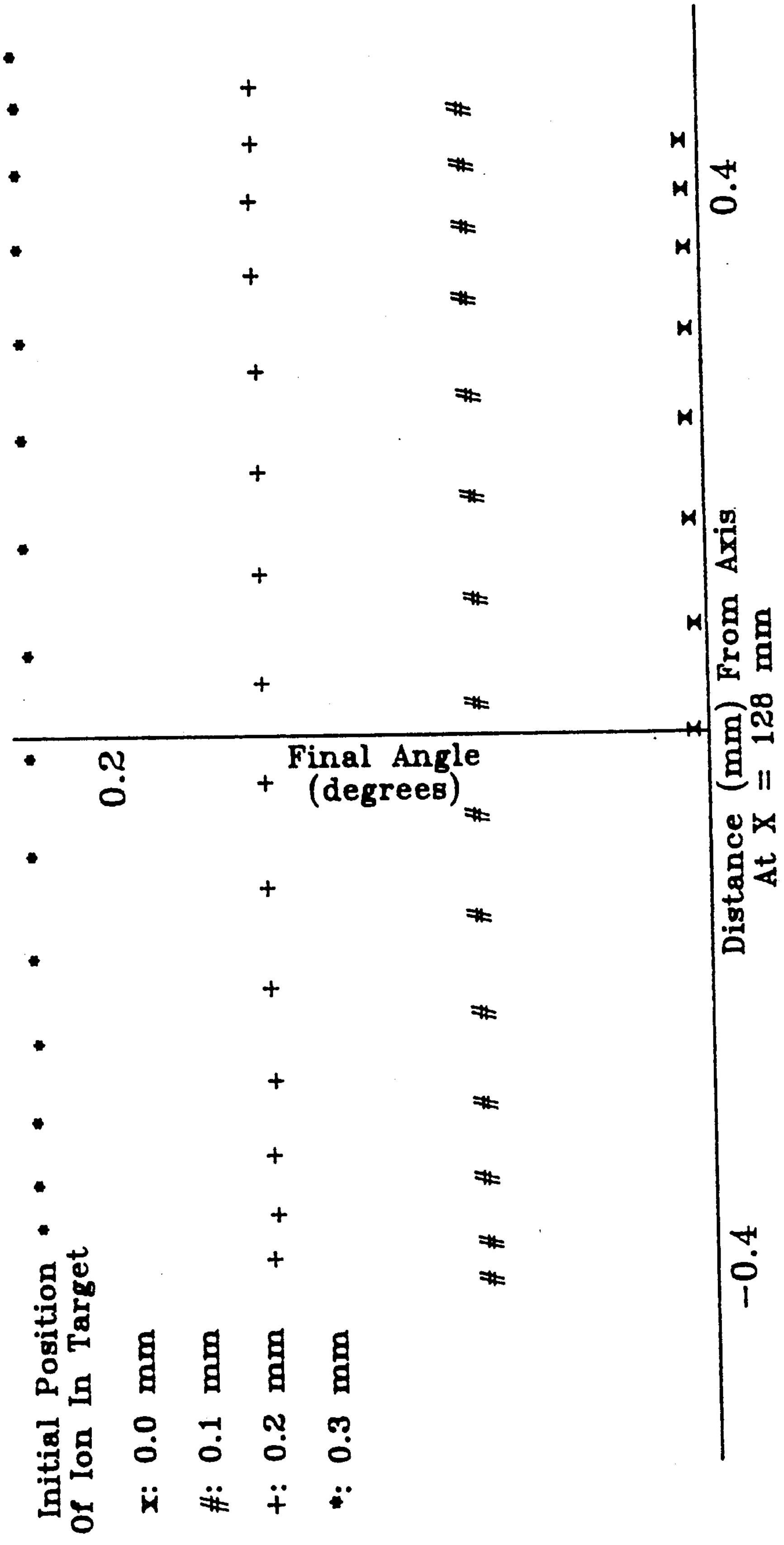
Figure 5C:
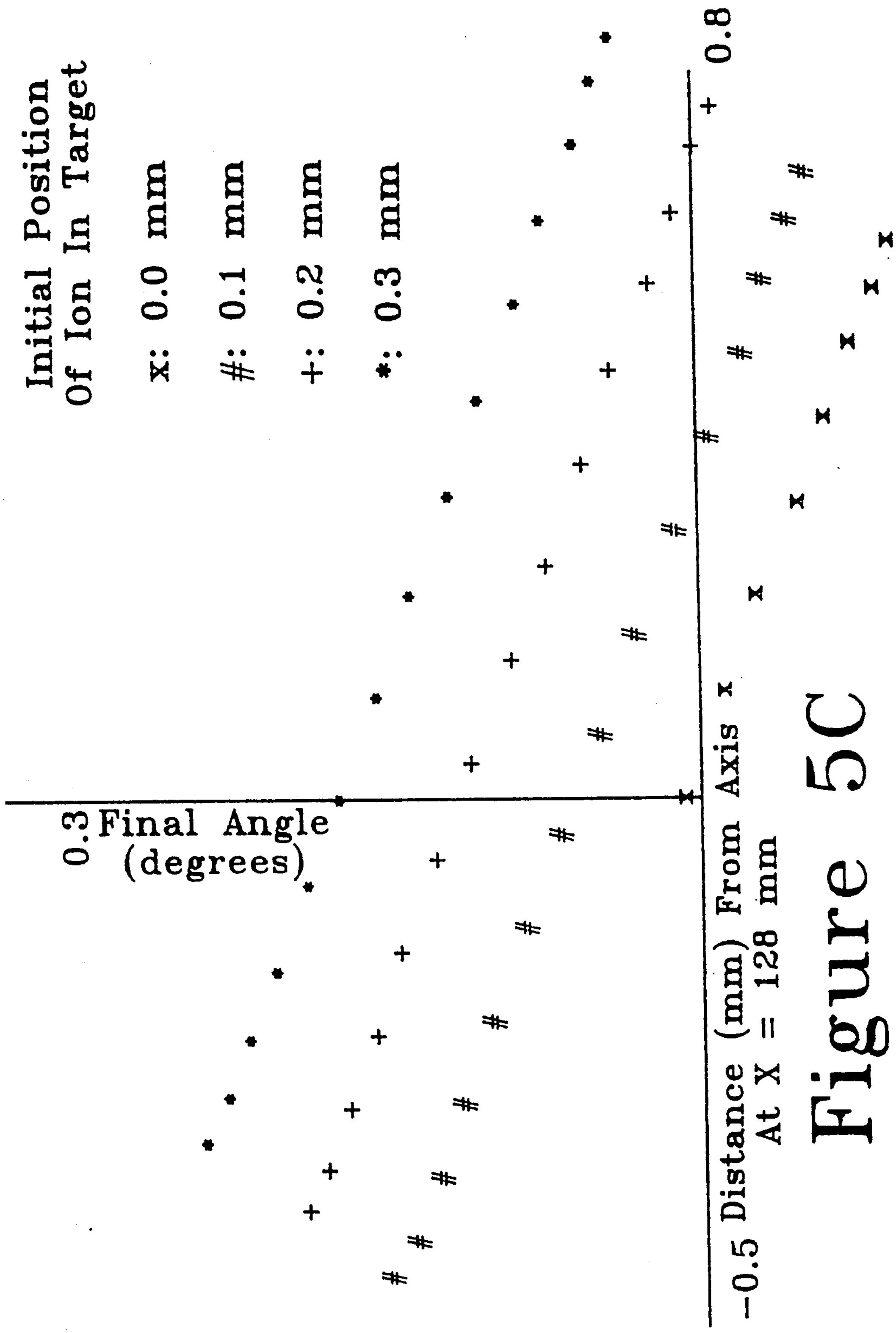
Figure 5D:
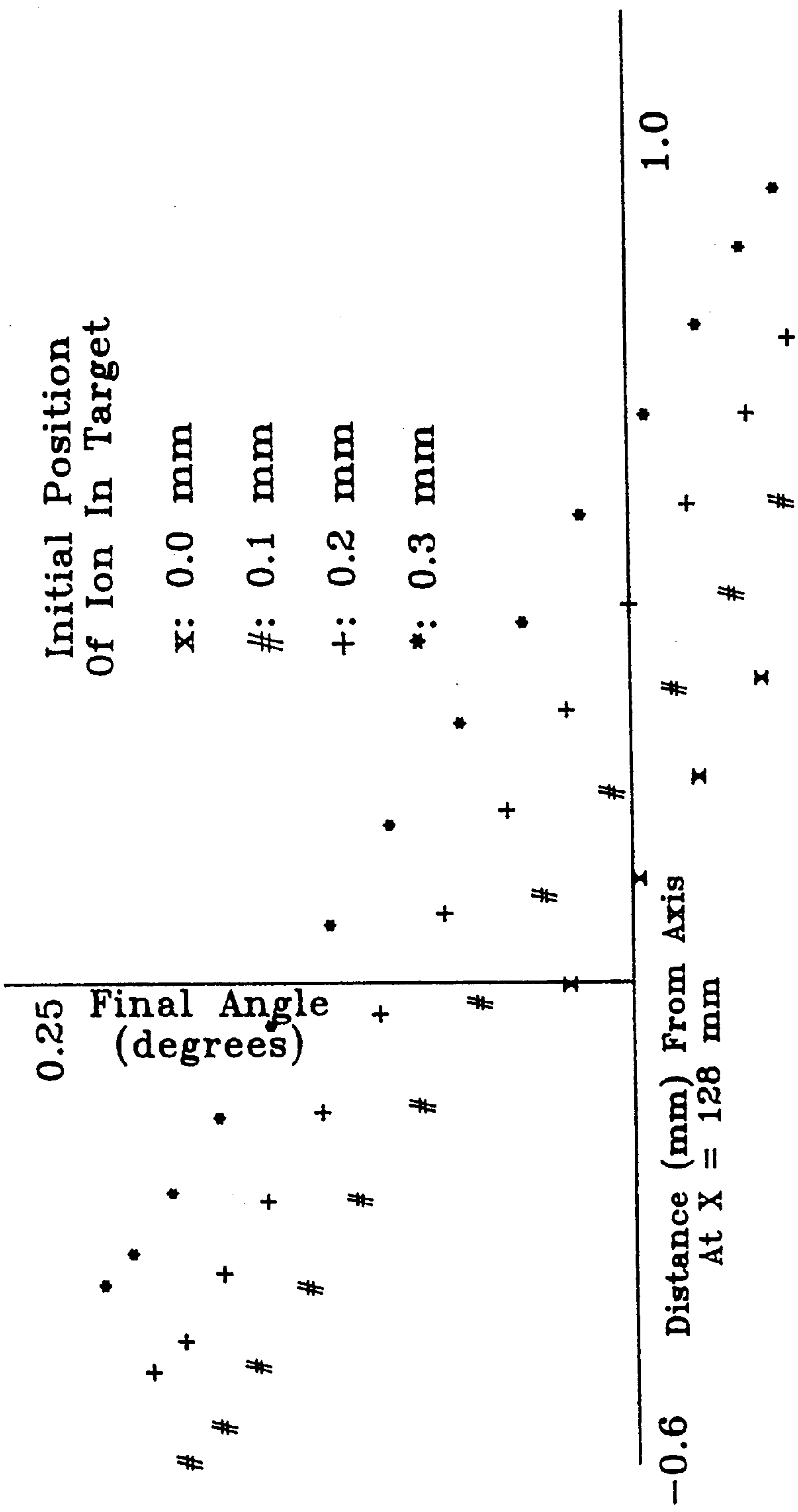
Figure 5E:
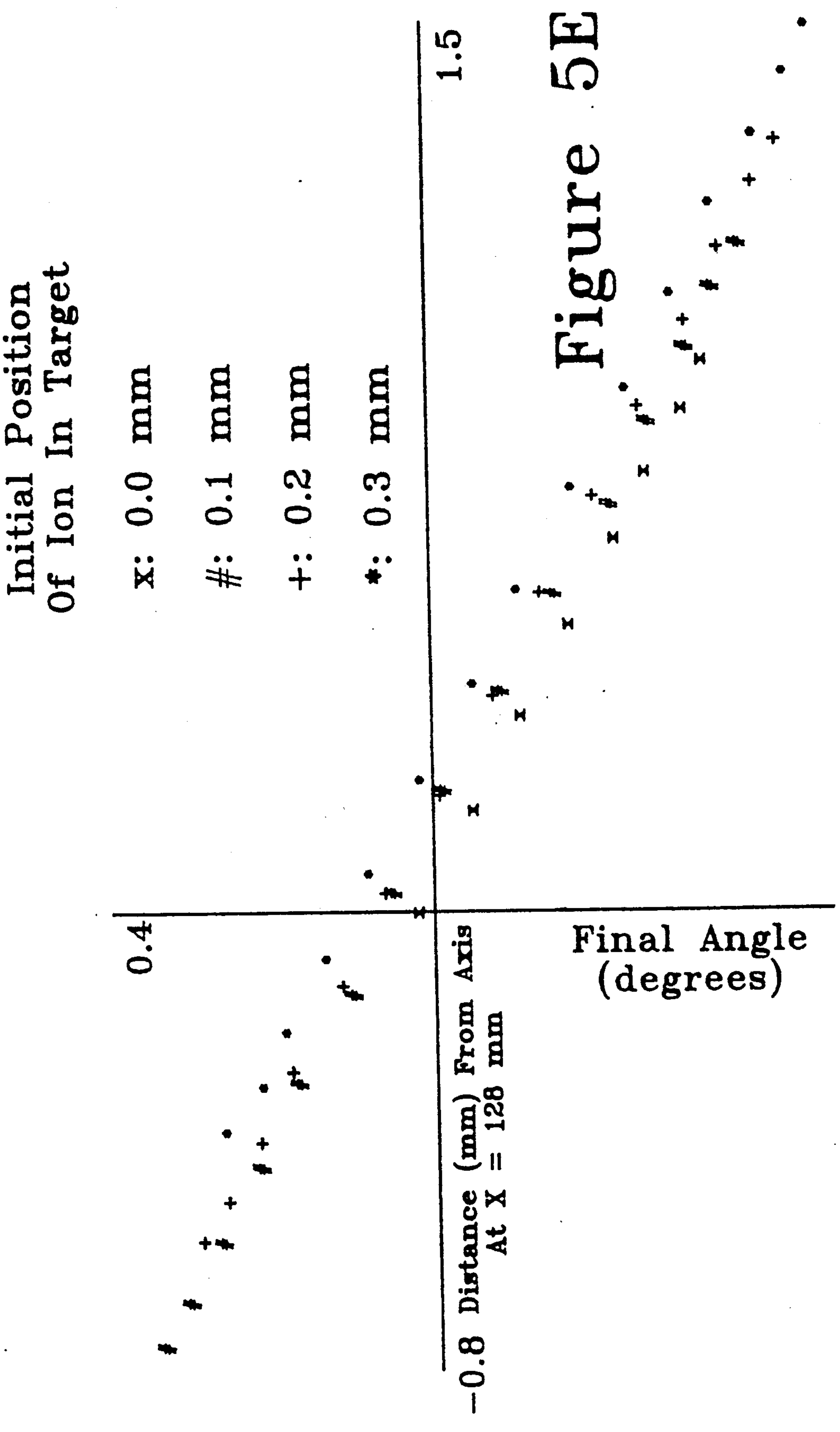
Figure 6A:
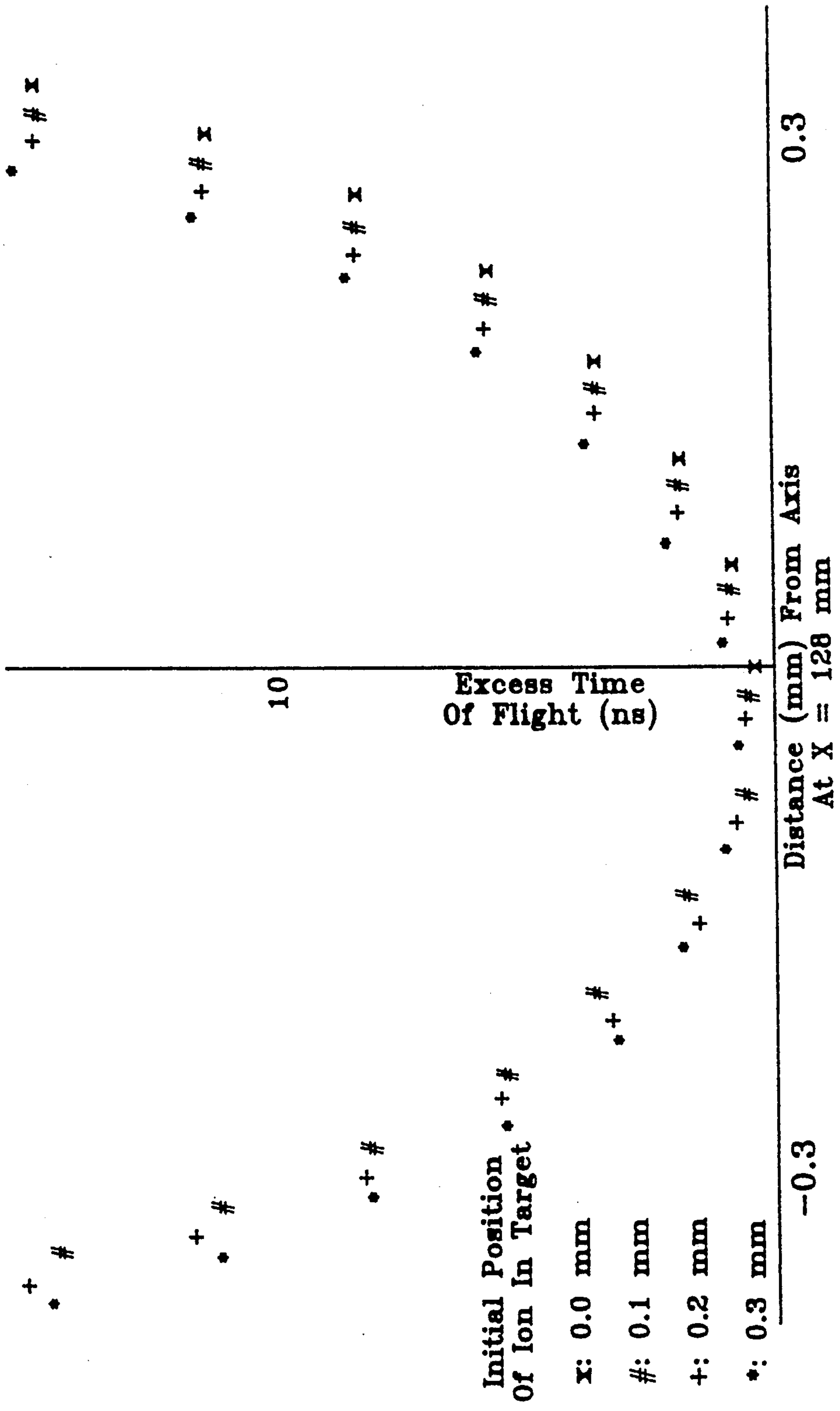
FIGS. 6A–6C illustrate the time-of-flight and off-axis distance of the same 53 ion trajectories for einzel lens voltages of −7,500 volts, −6,400 volts, and −1,000 volts, respectively.
Figure 6B:
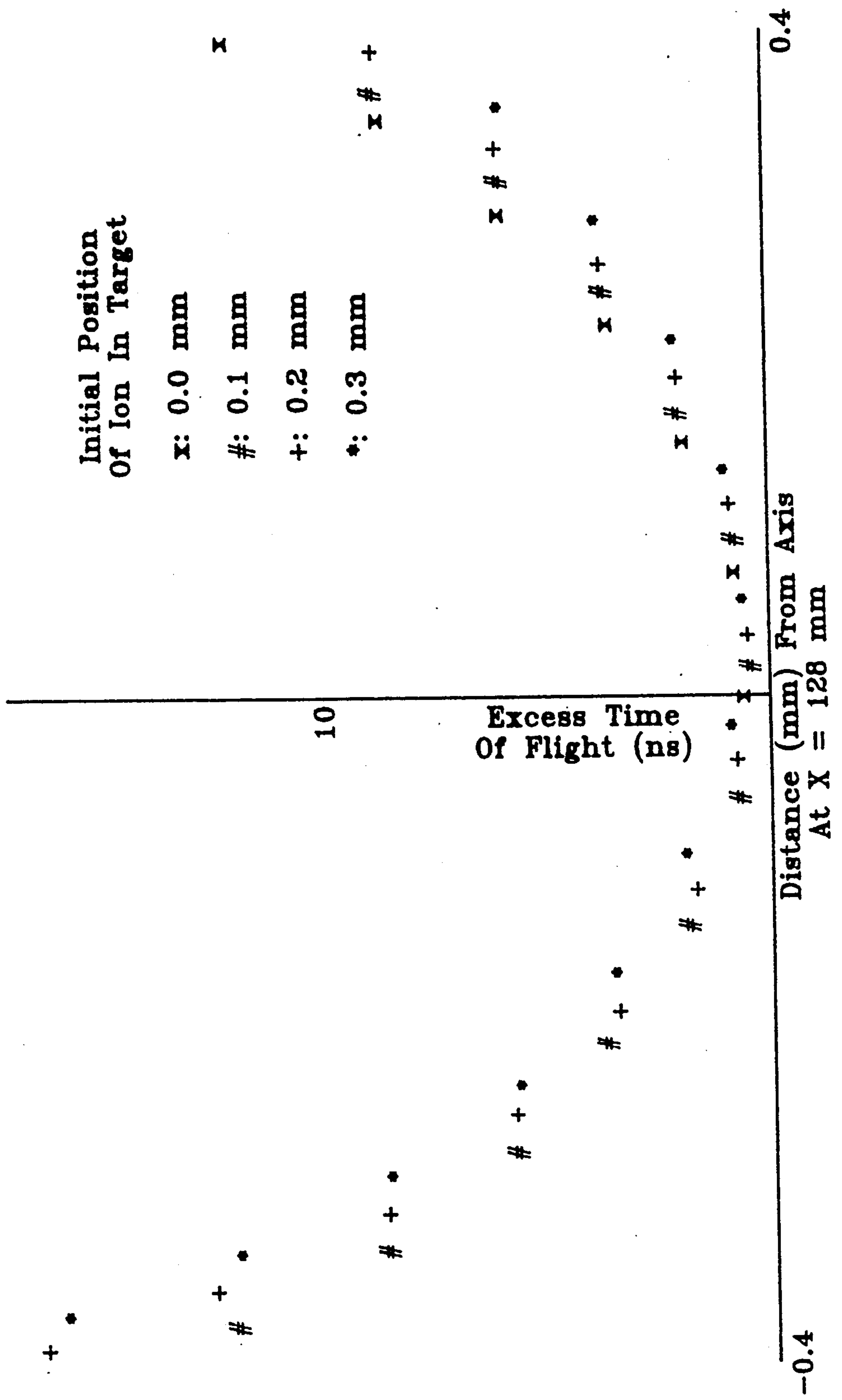
Figure 6C:
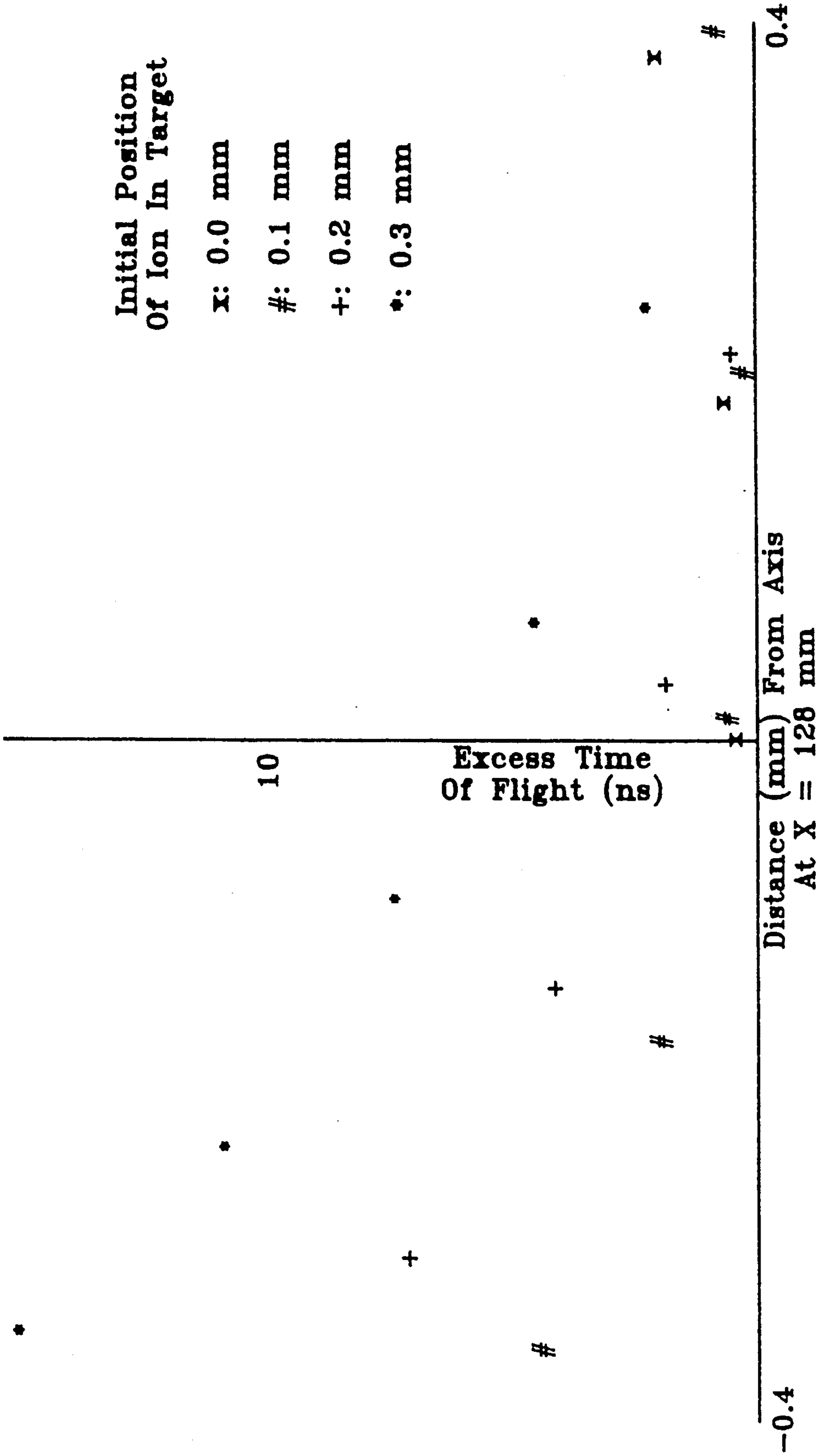

For these 53 trajectories, the lateral distance (i.e., the distance from axis A), the direction (relative to axis A) and the time-of-flight were calculated at a distance along axis A of 128 mm from target 23. A positive value of the product of the angular direction and the distance from the axis indicates that the ion is still converging toward the axis and a negative product indicates that such ion has crossed the axis. Because barrier 28 is the biased element of the einzel lens, this voltage affects the focussing of the emitted ions by the immersion lens (elements 23 and 25) and the einzel lens (elements 25, 28 and 210). These three sets of data were therefore calculated for five different values of voltage of barrier 28. FIGS. 5A-5E illustrate both the direction of the trajectory (relative to axis A) and the off-axis distance of these trajectories at 128 mm from the target. FIGS. 6A-6C illustrate both the time-of-flight and the off-axis distance (at 128 mm from the target) at three different einzel lens voltage for these trajectories. FIGS. 5A and 6A present data for trajectories with a voltage of −7,500 volts on barrier 28. FIGS. 5B and 6B are for a voltage of −6,400 volts, FIG. 5C is for a voltage of −5,000 volts, FIG. 5D is for a voltage of −4,000 volts, and FIGS. 5E and 6C are for a voltage of −1,000 volts.

FIGS. 6A-6C illustrate that the excess time-of-flight of a trajectory (i.e., the amount that the time-of-flight of a trajectory exceeds the minimal time-of-flight of any of these trajectories) varies substantially monotonically with the off-axis distance. This means that resolution can be improved by eliminating the ions that are farthest off-axis at the distance of 128 mm from the target. This can be achieved by locating at this distance an additional barrier 212 (illustrated in FIG. 2) having an aperture 213 centered on axis A.

The diameter of aperture 213 can be selected to eliminate a preselected group of the ion trajectories with greatest excess time-of-flight. For example, as illustrated in FIG. 6B, when the voltage of barrier 28 is −6,400 volts, if the radius of aperture 213 is 0.3 mm, then ions with an excess time-of-flight greater than 6 nanoseconds will be eliminated and, when the radius is 0.2 mm, ions with an excess time-of-flight greater than 3.5 nanoseconds will be eliminated. FIGS. 6A-6C illustrate that for each voltage of barrier 28, the radius of this aperture can be selected to block ions with any preselected excess time-of-flight exhibited by this system. Thus, the inclusion of an adjustable aperture 213 enables the controlled elimination of the longer time-of-flight ions.

Figure 7:
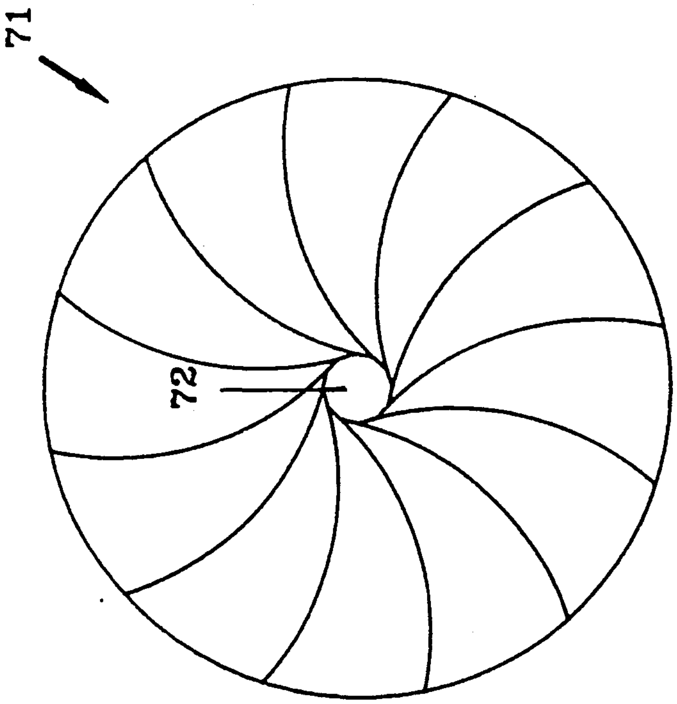
FIG. 7 illustrates an adjustable aperture diaphragm suitable for adjusting the resolution of the spectrometer.

FIG. 7 illustrates a conventional variable aperture diaphragm 71 such as is utilized in cameras. The diameter of aperture 72 can be varied in this device. This type of variable aperture can be utilized in barrier 212 to enable adjustment of system resolution. The aperture diameter can be altered by the user by means of a connecting mechanical linkage accessible by the user and connected to this adjustable diaphragm to enable variation of the aperture radius. Alternatively, a motor can be coupled to this variable aperture diaphragm to enable electronic control of the diaphragm diameter. Both mechanical and electrical linkages are well known from the camera art.

Although this aperture 213 will preferably be substantially circular and centered on the ion beam so that the aperture is substantially rotationally symmetric about the center of the ion beam, other shapes and alignment are acceptable as long as adjustment of the aperture dimensions and/or location function to vary the resolution. Indeed, aperture 72 is only substantially circular. An example of a noncircular aperture is a triangular aperture bounded by three opaque sheets each having a straight edge that defines a side of this aperture. Preferably, such an aperture would have the shape of an equilateral triangle so that it most closely approximates a circular aperture.

Figure 8:
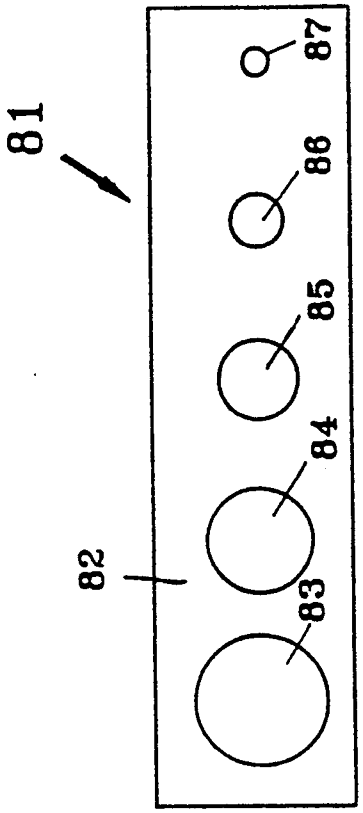
FIG. 8 illustrates an alternate mechanism for altering the aperture size to adjust resolution.

An alternate mechanism 81 for varying aperture size is illustrated in FIG. 8. In this embodiment, a plate 82 contains a set of apertures 83-88 that decrease monotonically in radius. This plate is mounted to slide laterally across axis A such that any selected one of these apertures can be moved to center on axis A. Motion of this plate can be achieved by a mechanical linkage accessible by the user or by an electronic linkage such as a motor controlled by electrical input from the user. Variable aperture mechanism 71 has the advantage of providing continuous variation of the radius of aperture 213. Variable aperture mechanism 81 has the advantage that it is structurally much simpler and therefore is less susceptible to damage from the impacts of the blocked ions.

FIGS. 6A-6C illustrate that, for a fixed radius aperture 213, the selection of the ions to be blocked can be achieved by variation of the voltage of barrier 28 in the einzel lens. For example, for ions originating from a spot radius of 0.1 mm on target 23 (i.e., those points indicated by the "#" sign) and an aperture radius 0.3 mm, from FIG. 6A it can be seen that, for a barrier 28 voltage of −7,500 volts, ions with excess time-of-flight greater than 14 nanoseconds are eliminated. For this same fixed aperture radius, from FIG. 6B it can be seen that, for a voltage of −6,400 volts on barrier 28, ions with excess time-of-flight greater than 7 nanoseconds are eliminated. Similarly, for this same fixed aperture radius, from FIG. 6C it can be seen that, for a voltage of −1,000 volts on barrier 28, ions with excess time-of-flight greater than 3 nanoseconds are eliminated.

Although the radius of aperture 213 and the voltage on barrier 28 can be fixed at values that achieve a preselected value of resolution, it is advantageous to be able to adjust the resolution because this also adjusts the device sensitivity. That is, the improved resolution is achieved by rejecting those ions with an excess time-of-flight greater than some selected value. The elimination of part of the ion beam reduces the sensitivity of the measurement. Therefore, the choices of voltage on barrier 28 and the radius of aperture 213 involve a tradeoff between resolution and sensitivity. Therefore, for increased flexibility, it is advantageous to include the ability to adjust at least one parameter that controls the tradeoff between resolution and sensitivity.

I claim:

1. A time-of-flight mass spectrometer having a controllable resolution, said spectrometer comprising:
   - a barrier having an aperture;
   - a detector;
   - means for producing, from a sample substance, a beam of sample ions, at least part of which passes through said aperture to said detector;
   - each ion being characterized by a time-of-flight extending from a time of generation of that ion until said ion is detected by said detector; and
   - said ions exhibiting at said aperture a time-of-flight distribution that is a function of a lateral distance from an axis parallel to said beam and located within said beam; and
   - means for varying the resolution by varying how much of this beam passes through said aperture.

2. A time-of-flight mass spectrometer as in claim 1 wherein said means for producing a beam of sample ion comprises:
   - a target;
   - means for emitting ions from said target; and
   - ion optics section for focussing these ions to form an ion beam.

3. A time-of-flight mass spectrometer as in claim 2 wherein said means for emitting ions from said target comprises a source of a laser beam that is directed onto the target to emit ions.

4. A time-of-flight mass spectrometer as in claim 2 wherein said ion optics section includes an immersion lens, whereby a high fraction of ions emitted from said target can be focussed into said ion beam.

5. A time-of-flight mass spectrometer as in claim 4 wherein said ion optics section includes an einzel lens having an electrode that is biased to a controllable voltage to adjust the resolution of this spectrometer.

6. A time-of-flight mass spectrometer as in claim 1 wherein said means for producing a beam includes an ion optics section that is adjustable to adjust the resolution of this spectrometer by eliminating ions having a greatest off-axis distance from a central axis of said beam.

7. A time-of-flight mass spectrometer as in claim 6 wherein said ion optics section includes an immersion lens having a voltage that can be adjusted to adjust the resolution.

8. A time-of-flight mass spectrometer as in claim 6 wherein said ion optics section includes an einzel lens having an electrode that is biased to a controllable voltage to adjust the resolution of this spectrometer.

9. A time-of-flight mass spectrometer as in claim 1 wherein the barrier having an aperture is within a substantially field-free region of the spectrometer, whereby this aperture does not interact with fields within the spectrometer.

10. A time-of-flight mass spectrometer as in claim 9 wherein the barrier having an aperture is adjacent to another element in the spectrometer and is attached to this element, whereby this aperture can be easily aligned with the ion beam.

11. A time-of-flight mass spectrometer having a controllable resolution, said spectrometer comprising:

a barrier having an aperture;

a detector;

means for producing, from a sample substance, a beam of sample ions, at least part of which passes through said aperture to said detector;

each ion being characterized by a time-of-flight extending from a time of generation of that ion until said ion is detected by said detector; and said ions exhibiting at said aperture a time-of-flight distribution that is a function of a lateral distance from an axis parallel to said beam and located within said beam; and means for varying the resolution by varying how much of this beam passes through said aperture;

wherein said aperture has an adjustable dimension that can be changed to adjust the resolution of this spectrometer.

12. A time-of-flight mass spectrometer having a controllable resolution, said spectrometer comprising:

a barrier having an aperture;

a detector;

means for producing, from a sample substance, a beam of sample ions, at least part of which passes through said aperture to said detector;

each ion being characterized by a time-of-flight extending from a time of generation of that ion until said ion is detected by said detector; and said ions exhibiting at said aperture a time-of-flight distribution that is a function of a lateral distance from an axis parallel to said beam and located within said beam; and means for varying the resolution by varying how much of this beam passes through said aperture;

wherein said barrier contains a plurality of apertures of different sizes and said barrier can be translated in a direction lateral to said ion beam to selectively align any selected one of these apertures in the path of the ion beam to adjust a resolution of this spectrometer.

* * * * *